US011827300B1

(12) United States Patent
Staal et al.

(10) Patent No.: US 11,827,300 B1
(45) Date of Patent: Nov. 28, 2023

(54) BUTTERFLY FOLDING SEAT MECHANISM FOR PERSONAL TRANSPORT DEVICE (71) Applicant: Honda Motor Co., Ltd., Tokyo (JP)

(72) Inventors: Matthew B. Staal, Torrance, CA (US); Jackie P. Porchay, Torrance, CA (US); Michael Jin Kim, Long Beach, CA (US); Ming Hsein Lee, Taichung (TW); Ding Jong Chou, Taichung (TW); Sheng Yu Huang, Taichung (TW)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/509,461

(22) Filed: Oct. 25, 2021

(51) Int. Cl.
B62J 1/12 (2006.01)
B62J 1/00 (2006.01)
B62J 1/08 (2006.01)

(52) U.S. Cl.
CPC ............... B62J 1/12 (2013.01); B62J 1/007 (2013.01); B62J 1/08 (2013.01)

(58) Field of Classification Search
CPC ..... B62K 15/00; B62J 1/12; B62J 1/04; B62J 1/007; B62J 1/08
See application file for complete search history.

(56) References Cited

U.S. PATENT DOCUMENTS

| 656,854 | A | * | 8/1900 | Nord | ..................... B62J 1/005 297/312 |
| 6,273,442 | B1 | * | 8/2001 | Fallon | ............... B62K 15/008 280/30 |
| 8,002,346 | B2 | | 8/2011 | Wen | |
| 8,443,920 | B2 | * | 5/2013 | Gomi | ..................... B62J 25/04 180/21 |
| 8,522,902 | B2 | * | 9/2013 | Gomi | ................... B62K 11/007 180/21 |
| 8,554,391 | B2 | * | 10/2013 | Takenaka | ............... B62J 1/005 701/1 |
| 9,102,377 | B2 | | 8/2015 | Reeb | |
| 9,321,496 | B2 | | 4/2016 | Curless | |
| 9,623,926 | B2 | | 4/2017 | Alink | |
| 9,676,443 | B2 | | 6/2017 | Perkins et al. | |

(Continued)

FOREIGN PATENT DOCUMENTS

CN 101758873 B 7/2011
CN 106005195 A 10/2016
(Continued)

Primary Examiner — Philip F Gabler
(74) Attorney, Agent, or Firm — Plumsea Law Group, LLC (57) ABSTRACT A seat for a personal transport device is provided. The seat includes a first seat body portion and a second body portion disposed on an opposite side of a midline from the first seat body portion. The midline is aligned along a longitudinal direction of the seat. The seat also includes a folding mechanism attached to the first seat body portion and the second seat body portion. The folding mechanism is configured to fold the seat along the midline to transition the seat between an unfolded configuration and a folded configuration. In one embodiment, the folding mechanism includes a spine extending underneath the seat in the longitudinal direction, a pair of plates disposed at opposite ends of the spine, a plurality of support members attached at one end to the spine and at an opposite end to the first seat body portion or the second seat body portion.

20 Claims, 8 Drawing Sheets (56) References Cited

U.S. PATENT DOCUMENTS

| | | | |
|---|---|---|---|
| 9,896,148 B2 * | 2/2018 | Baba | ............... B62K 19/02 |
| 10,053,179 B2 | 8/2018 | Xie | |
| 2011/0260510 A1 | 10/2011 | Hsu | |

FOREIGN PATENT DOCUMENTS

| CN | 205872313 U | 1/2017 |
|---|---|---|
| CN | 105151169 B | 7/2017 |

* cited by examiner

BUTTERFLY FOLDING SEAT MECHANISM FOR PERSONAL TRANSPORT DEVICE

BACKGROUND

This disclosure relates generally to vehicles, and in particular to a butterfly folding seat mechanism for a compact personal transport device that is convertible between a stowed configuration and a riding configuration.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network. One existing barrier to widespread use of compact personal transport devices is the time needed to set up and collapse the devices before and after their use.

Accordingly, there is a need in the art for an improved compact personal transport device that can be set up and collapsed quickly.

SUMMARY

In one aspect, a seat for a personal transport device is provided. The seat includes a first seat body portion and a second body portion. The second seat body portion is disposed on an opposite side of a midline from the first seat body portion. The midline being aligned along a longitudinal direction of the seat. The seat also includes a folding mechanism attached to the first seat body portion and the second seat body portion. The folding mechanism is configured to fold the seat along the midline to transition the seat between an unfolded configuration and a folded configuration.

In another aspect, a butterfly folding seat mechanism for a personal transport device is provided. The butterfly folding seat mechanism including a spine extending underneath a seat of the personal transport device. The spine is aligned along a longitudinal direction. The butterfly folding seat mechanism also includes a pair of plates disposed at opposite ends of the spine. The butterfly folding seat mechanism further includes a plurality of support members. Each support member of the plurality of support members is attached at one end to the spine and at an opposite end to at least one of a first seat body portion or a second seat body portion.

In another aspect, a personal transport device is provided. The personal transport device including an outer casing, a front wheel, and a rear wheel. The personal transport device also including a seat. The seat includes a first seat body portion and a second seat body portion. The second seat body portion is disposed on an opposite side of a midline from the first seat body portion. The midline being aligned along a longitudinal direction of the seat. The seat also includes a folding mechanism attached to the first seat body portion and the second seat body portion. The folding mechanism is configured to fold the seat along the midline to transition the seat between an unfolded configuration and a folded configuration.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a compact personal transport device with a butterfly folding seat mechanism that allows the seat of the personal transport device to fold in half so that it may be folded or stowed inside the personal transport device in the stowed configuration. The techniques described in connection with the present embodiments may be used to provide a personal transport device having a convenient folding seat mechanism that allows a user to sit on the seat in the riding configuration and to quickly collapse the personal transport device to the stowed configuration. In the stowed configuration, the personal transport device has a compact form factor that allows a user to carry it in a primary vehicle, on public transportation, and/or on other forms of transportation to be used for "last-mile" or "first-mile" trips to and from a destination.

The example embodiments are described herein with reference to a personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of personal transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned between a riding configuration in which components of the electric scooter are in extended positions outside of the rectangular outer casing so that the electric scooter may be operated or ridden by a user to a stowed configuration in which components of the electric scooter are folded or stowed inside the outer casing.

Figure 1:
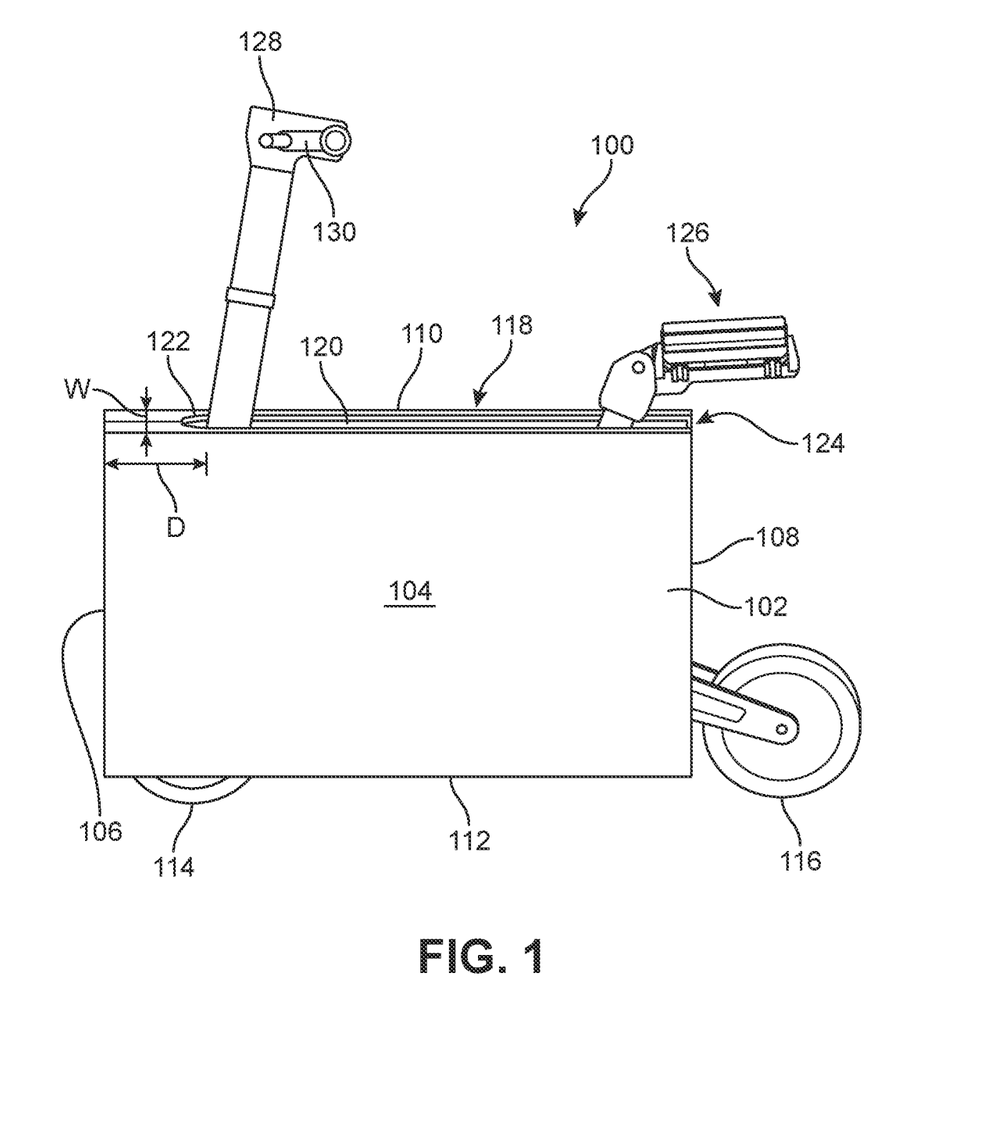
FIG. 1 is a side view of an example embodiment of a compact personal transport device in the form of an electric scooter in a riding configuration in accordance with aspects of the present disclosure.

Referring now to FIG. 1, an example embodiment of a personal transport device 100 (e.g., in the form of an electric scooter 100) is shown. In some embodiments, electric scooter 100 may be transitioned or converted between a riding configuration in which components of electric scooter 100 are in extended positions outside of an outer casing 102 so that electric scooter 100 may be operated or ridden by a user to a stowed configuration in which components of electric scooter 100 are folded or collapsed to stowed positions inside outer casing 102. As shown in FIG. 1, electric scooter 100 is in the riding configuration.

In this embodiment, outer casing 102 of electric scooter 100 includes a first side surface 104 (shown in FIG. 1) and an opposite second side surface (not shown). Outer casing 102 has a width (W) between first side surface 104 and the opposite second side surface that defines a thickness of electric scooter 100. In an example embodiment, side surfaces of outer casing 102 are substantially flat, including each of first side surface 104 and the opposite second side surface. Outer casing 102 of electric scooter 100 extends longitudinally between a front edge 106 and an opposite rear edge 108, and extends vertically between a top edge 110 and an opposite bottom edge 112. Front edge 106, rear edge 108, top edge 110, and bottom edge 112 are substantially straight and define an outer perimeter of rectangular-shaped outer casing 102 of electric scooter 100.

In this embodiment, a front wheel 114 is visible along bottom edge 112 of electric scooter 100 near front edge 106. Electric scooter 100 also includes a rear wheel 116 that is shown extended outside of outer casing 102 (i.e., in the riding configuration as shown in FIG. 1) along bottom edge 112 near rear edge 108. Rear wheel 116 is configured to slide or retract inside of outer casing 102 in the stowed configuration.

Electric scooter 100 includes a top surface 118 disposed between first side surface 104 and the opposite second side surface. In an example embodiment, top surface 118 includes an opening 120 extending substantially along the length of electric scooter 100 (i.e., from front edge 106 to rear edge 108). In one embodiment, opening 120 is disposed spaced apart from front edge 106 of electric scooter 100 and extends all the way to rear edge 108. For example, as shown in FIG. 1, opening 120 extends along top surface 118 from a first end 122 to a second end 124 located at rear edge 108. In this embodiment, first end 122 of opening 120 is spaced apart from front edge 106 by a distance (D) so that opening 120 is offset on top surface 118. In some embodiments, opening 120 extends to rear edge 108 along top surface 118 and partially extends down rear edge 108. In this embodiment, opening 120 is in the form of a slot disposed between first side surface 104 and the opposite second side surface.

In some embodiments, electric scooter 100 includes components configured to allow a user to ride electric scooter 100 in the riding configuration. For example, in this embodiment, electric scooter 100 includes a seat 126 and a steering assembly 128. In one embodiment, seat 126 is configured to mount to a seat linkage that is attached internally to the inside of electric scooter 100 (e.g., inside outer casing 102). Seat 126 is also attached to a hinge mechanism or pivot mechanism that allows seat 126 to be collapsed or stowed inside outer casing of electric scooter 100 in the stowed configuration (i.e. through opening 120).

Steering assembly 128 is configured to control orientation of front wheel 114 to allow a user to steer electric scooter 100 in the riding configuration. In an example embodiment, steering assembly 128 includes a handlebar 130 that is configured to receive hands of a user to steer front wheel 114. In some embodiments, steering assembly 128 may include additional components that allow a user to control electric scooter 100, such as, for example, throttle and brake controls, which may be located on handlebar 130.

It should be understood that a personal transport device according to the embodiments described herein may include additional components not shown or described. For example, a personal transport device in the form of an electric scooter (e.g., electric scooter 100) may include components such as a battery, throttle and brake controls, lights, etc. that allow a user to ride the electric scooter. Other embodiments of personal transport devices may also include additional or different components without departing from the techniques of the present embodiments described herein.

Figure 2:
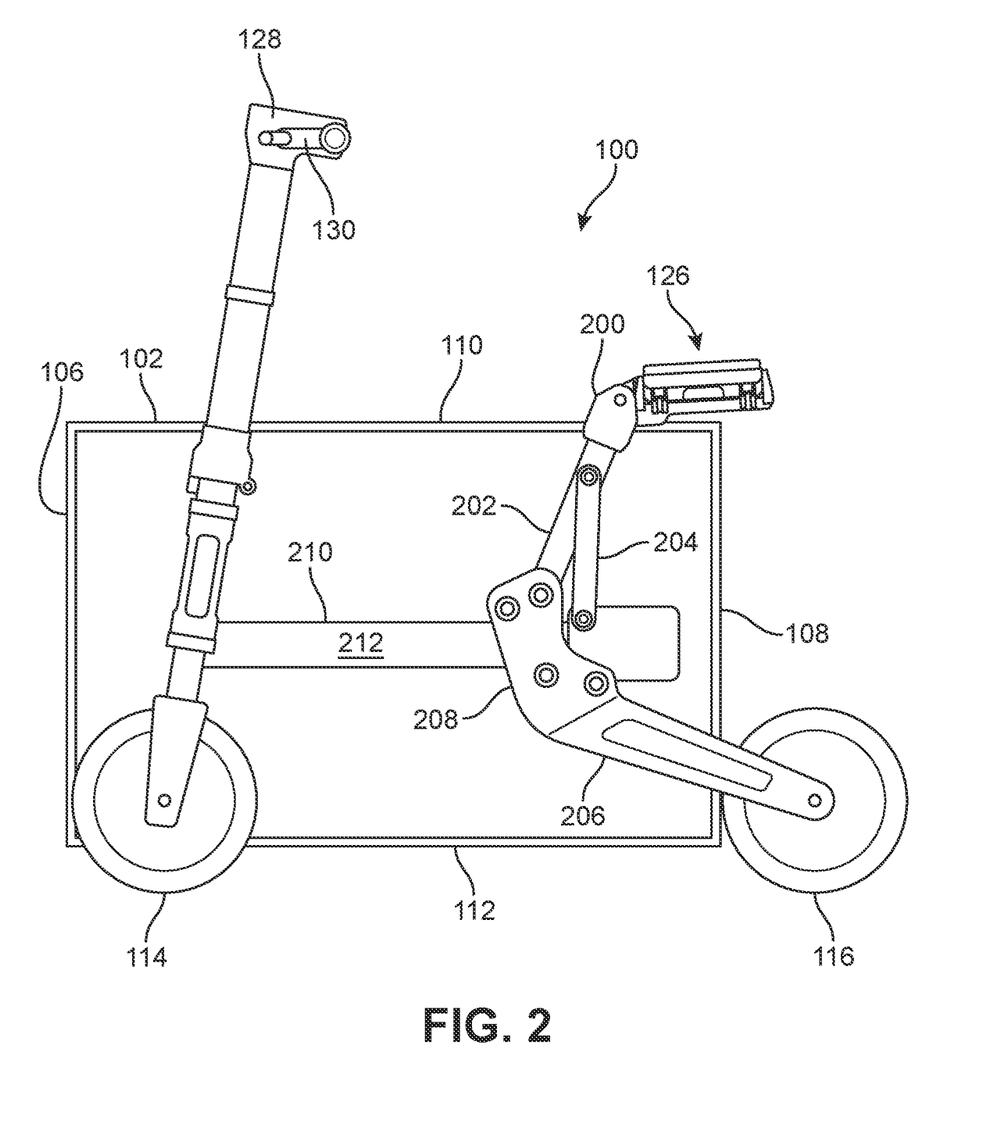
FIG. 2 is a side view showing internal components of the compact personal transport device of FIG. 1 in accordance with aspects of the present disclosure.

Referring now to FIG. 2, a side view showing the internal components of personal transport device in the form of electric scooter 100 is shown. In this view, outer casing 102 of electric scooter 100 is shown in cross-section so that the internal components are visible. In an example embodiment, electric scooter 100 includes hinge mechanism 200 connected to seat 126 that allows seat 126 to fold inwards into opening 120 in outer casing 102 of electric scooter 100. In this embodiment, hinge mechanism 200 is in the form of a hinge, but in other embodiments, hinge mechanism 200 may be any other type of mechanism that permits seat 126 to fold or collapse inwards into opening 120, such as a ball and socket joint, a pivot mechanism, or other apparatus. In some embodiments, hinge mechanism 200 may be connected to a seat post 202 that is attached internally inside outer casing 102 of electric scooter 100. For example, in this embodiment, hinge mechanism 200 is disposed at a top end of seat post 202 and an opposite bottom end of seat post 202 is attached to a carrier 208 on a rear wheel arm 206. Carrier 208 is attached in a slidable manner to a track 212 of a sliding mechanism 210. For example, carrier 208 may include a bearing assembly or similar apparatus to allow carrier 208 to slide back and forth (i.e., forwards towards front edge 106 or rearwards towards rear edge 108) along track 212 of sliding mechanism 210 in a substantially horizontal direction so that rear wheel 116 can move between an extended position (i.e., when electric scooter 100 is in the riding configuration) and a stowed position (i.e., when electric scooter 100 is in the stowed configuration).

In some embodiments, seat post 202 may also be attached to a linkage 204 that mechanically connects seat post 202 to a fixed component inside outer casing 102 of electric scooter 100. For example, in this embodiment, linkage 204 is connected to seat post 202 at one end and to an end portion of track 212 at an opposite end. With this arrangement, linkage 204 mechanically causes seat 126 to collapse inside outer casing 102 of electric scooter 100 when carrier 208 attached to seat post 202 slides forward along track 212 (e.g., towards front edge 106) and similarly causes seat 126 to extend outside outer casing 102 of electric scooter 100 when carrier 208 slides rearwards along track 212 (e.g., towards rear edge 108).

Figure 3:
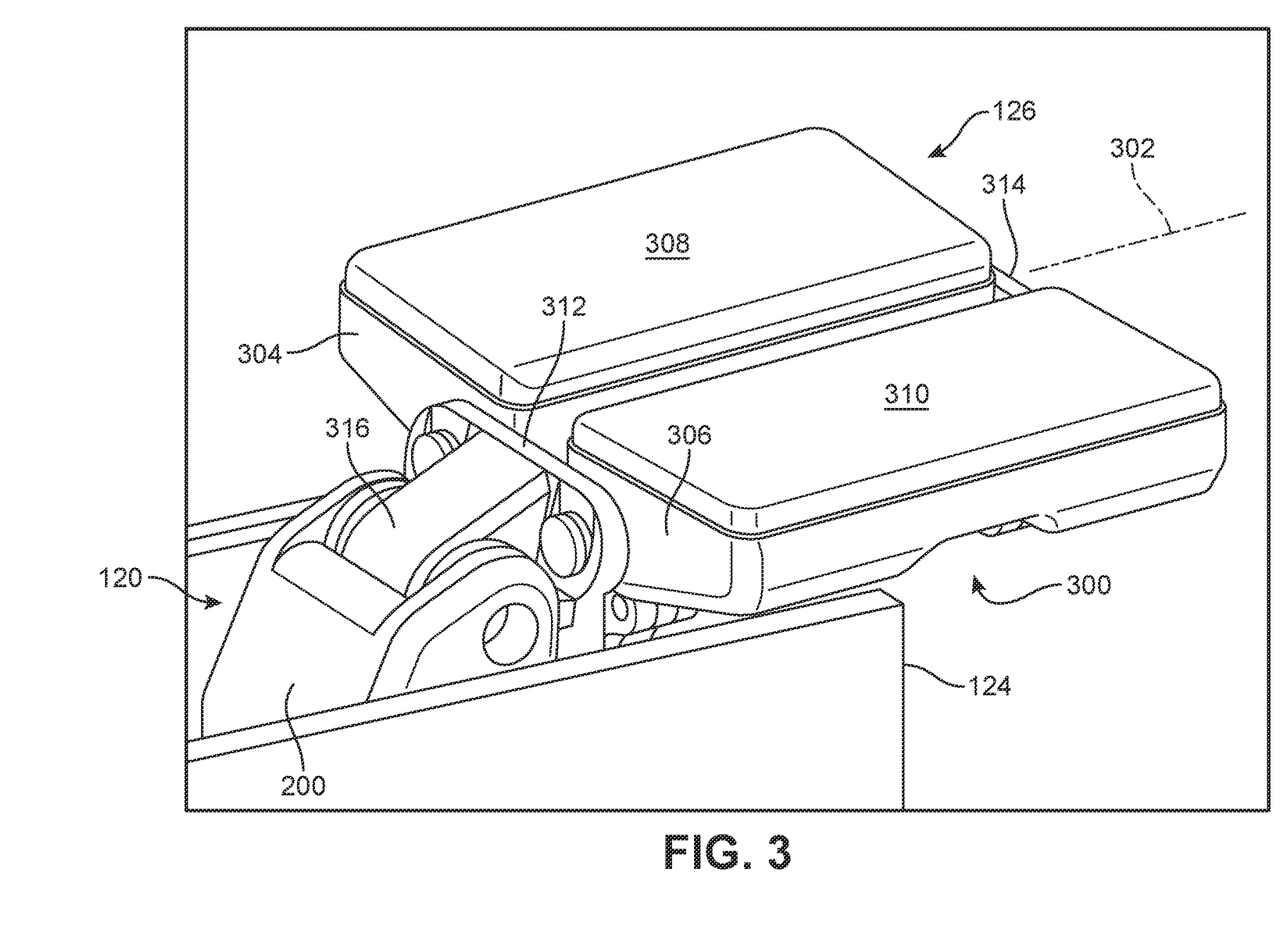
FIG. 3 is an enlarged view of an example embodiment of a seat of the compact personal transport device in accordance with aspects of the present disclosure.

Referring now to FIG. 3, an enlarged view of seat 126 at second end 124 of opening 120 located at rear edge 108 is shown. In an example embodiment, seat 126 includes a butterfly folding seat mechanism 300 (also referred to herein as "folding mechanism 300"). Butterfly folding seat mechanism 300 is configured to fold seat 126 along a midline 302 that is aligned along a longitudinal direction of seat 126. In one embodiment, midline 302 is also aligned in the same direction as length (L) of electric scooter 100. Midline 302 extends through the longitudinal center of seat 126 and defines two, symmetrical halves of seat 126 that are mirror images of each other. For example, in this embodiment, midline 302 divides seat 126 into a first seat body portion 304 on one side of midline 302 and a second seat body portion 306 on an opposite side of midline 302. In this embodiment, first seat body portion 304 and second seat body portion 306 are substantially similar mirror images of each other (i.e., first seat body portion 304 and second seat body portion 306 are symmetric with respect to midline 302).

In an example embodiment, seat 126 includes a seat surface configured to provide a support platform for a user of electric scooter 100 to sit on while riding electric scooter 100 in the riding configuration. In this embodiment, the seat surface includes a first seat surface 308 on a top portion of first seat body portion 304 and a second seat surface 310 on a top portion of second seat body portion 306 located on the opposite side of midline 302 from first seat surface 308. Together, first seat surface 308 and second seat surface 310 provide a support platform for a user of electric scooter 100 to sit on while riding electric scooter 100.

In some embodiments, folding mechanism 300 may include a pair of plates 312, 314 arranged at opposite longitudinal ends of seat 126 that connect first seat body portion 304 and second seat body portion 306 to folding mechanism 300. As shown in FIG. 3, a front plate 312 is disposed at the front of seat 126 adjacent to hinge mechanism 200. An opposite rear plate 314 is located at the back of seat 126 rearward of second end 124 of opening 120 and extending past rear edge 108. In an example embodiment, a knuckle 316 extends forward from front plate 312 and engages with hinge mechanism 200. For example, knuckle 316 may include a through hole or aperture that allows it to connect to hinge mechanism 200 via a pin or similar member inserted within the through hole or aperture to connect knuckle 316 to hinge mechanism 200. With this arrangement, seat 126 may be attached to hinge mechanism 200 so that seat 126 can be folded into opening 120 in outer casing 102 of electric scooter 100 (and similarly be unfolded or extended out of opening 120 in outer casing 102).

As shown in FIG. 3, seat 126 is in an unfolded configuration with first seat body portion 304 and second seat body portion 306 being substantially flat so that first seat surface 308 and second seat surface 310 can be sat on by a user of electric scooter 100 in the riding configuration. When seat 126 is in the unfolded configuration, first seat body portion 304 and second seat body portion 306 extend at least partially past the side surfaces of outer casing 102 (e.g., first side surface 104 and the opposite second side surface). That is, in the unfolded configuration, seat 126 is wider than width (W) of electric scooter 100. According to the principles of the example embodiments described herein, folding mechanism 300 is configured to allow seat 126 to be folded in half along midline 302 so that seat 126 in the folded configuration can be inserted or folded through opening 120 in outer casing 102 to be stowed when electric scooter is in the stowed configuration.

Figure 4:
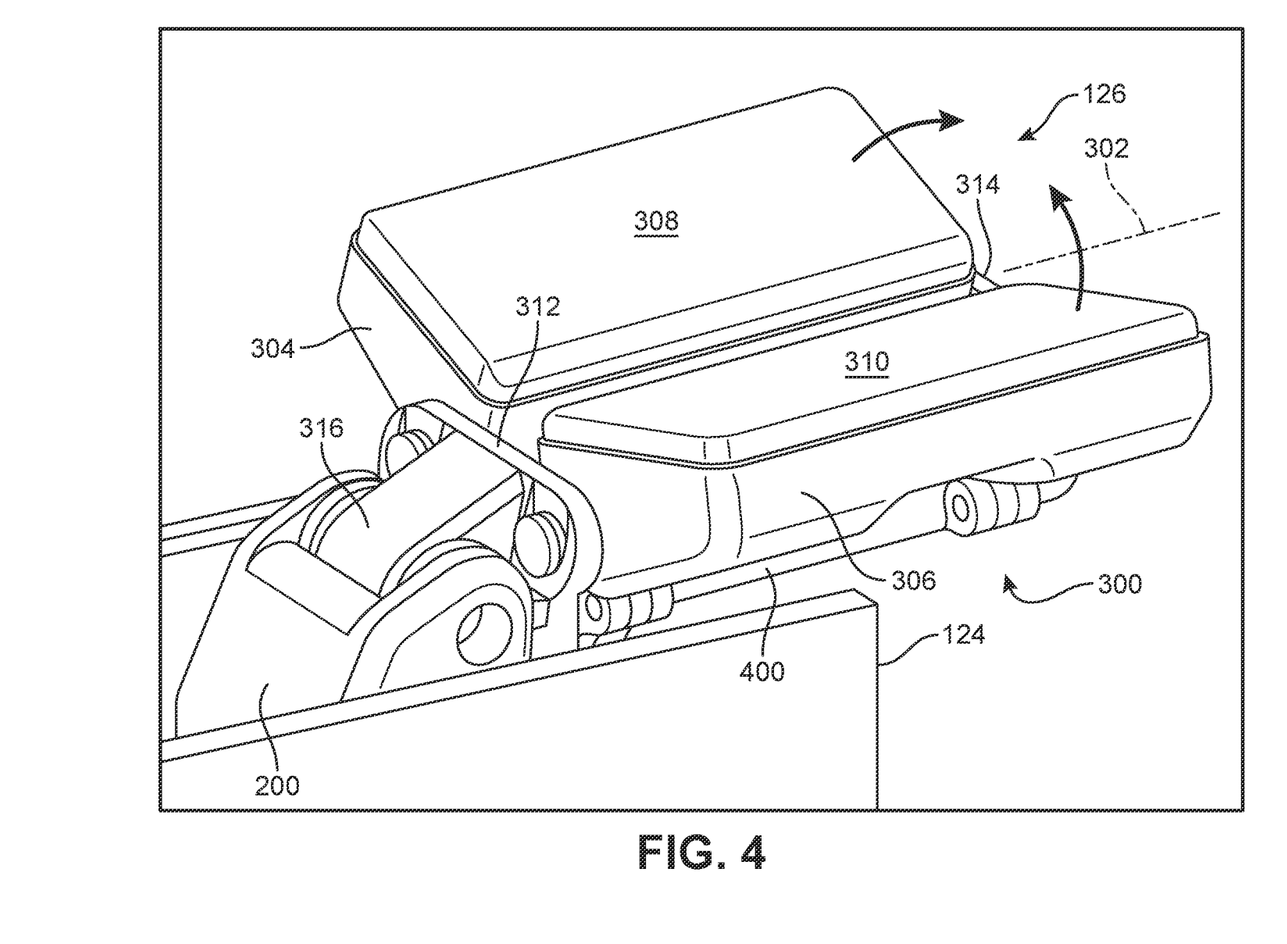
FIG. 4 is an enlarged view of the example embodiment of the seat in a partially folded configuration in accordance with aspects of the present disclosure.

Referring now to FIG. 4, seat 126 is shown in a partially folded configuration. In this embodiment, first seat body portion 304 and second seat body portion 306 are being folded inwards at midline 302 so that first seat surface 308 and second seat surface 310 are being brought towards each other. In an example embodiment, folding mechanism 300 includes a spine 400 that extends between front plate 312 and rear plate 314. Spine 400 extends approximately parallel to midline 302 along an underside of seat 126 and provides a rigid structure onto which one or more support members can be attached to assist with providing support to seat 126, as will be described further below in reference to FIGS. 5 and 6.

Figure 5:
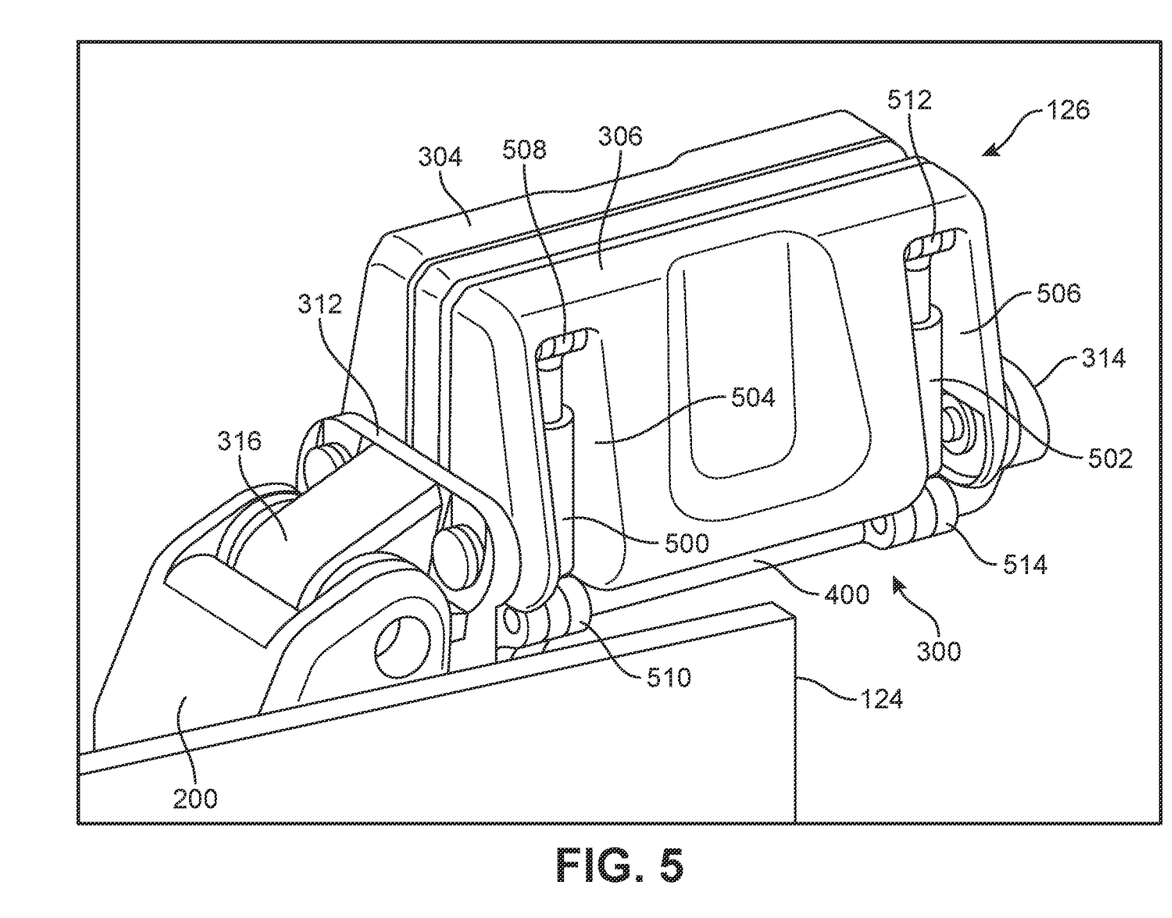
FIG. 5 is an enlarged view of the example embodiment of the seat in a folded configuration in accordance with aspects of the present disclosure.

FIG. 5 illustrates seat 126 in a folded configuration. In this embodiment, first seat body portion 304 and second seat body portion 306 are completely folded inwards along midline 302 so that first seat surface 308 and second seat surface 310 are facing each other. In some embodiments, first seat surface 308 and second seat surface 310 may be in contact when seat 126 is in the folded configuration shown in FIG. 5. In other embodiments, first seat surface 308 and second seat surface 310 may be adjacent to each other and separated by a small gap or space (e.g., approximately 1-5 millimeters). Folding mechanism 300 allows seat 126 to fold in half along midline 302 so that seat 126 transitions from an approximately flat, planar arrangement when seat 126 is in the unfolded configuration (e.g., shown in FIG. 3) to an approximately perpendicular arrangement (i.e., approximately 90 degrees from the unfolded configuration) when seat 126 is in the folded configuration (e.g., shown here in FIG. 5).

In some embodiments, folding mechanism 300 may include a plurality of support members that are connected to spine 400 and provide support to seat 126. In an example embodiment, folding mechanism 300 includes at least a first support member 500 and a second support member 502 attached to spine 400. In this embodiment, first support member 500 and second support member 502 are connected to second seat body portion 306 of seat 126. The underside or bottom of second seat body portion 306 includes corresponding recesses or cavities into which first support member 500 and second support member 502 are disposed. As shown in FIG. 5, first support member 500 is disposed in a first cavity 504 on the underside of second seat body portion 306 and second support member 502 is disposed in a second cavity 506 on the underside of second seat body portion 306.

In an example embodiment, first support member 500 and second support member 502 are attached to spine 400 at one end and are attached to second seat body portion 306 on an opposite end. For example, as shown in FIG. 5, first support member 500 is attached to the underside of second seat body portion 306 at a first end 508 and to spine 400 at an opposite second end 510. Similarly, second support member 502 is attached to the underside of second seat body portion 306 at a first end 512 and to spine 400 at an opposite second end 514. It should be understood that the plurality of support members also include a substantially similar arrangement on the opposite side of seat 126 associated with first seat body portion 304. That is, first seat body portion 304 includes at least two support members disposed in corresponding recesses or cavities that are attached to the bottom or underside of first seat body portion 304 at one end and are attached to spine 400 of folding mechanism 300 at the opposite end.

In an example embodiment, the plurality of support members, including first support member 500 and second support member 502, are attached approximately perpendicular to spine 400. With this arrangement, a longitudinal length of first support member 500 and second support member 502 is orthogonal to midline 302. When seat 126 is in the folded configuration (e.g., as shown here in FIG. 5), first support member 500 and second support member 502 are vertical and are approximately aligned along the same direction as the height of electric scooter 100. In this embodiment, first support member 500 and second support member 502 are visible on the underside or bottom of second seat body portion 306. When seat 126 is in the unfolded configuration (e.g., as shown in FIG. 3), first support member 500 and second support member 502 are horizontal and are approximately aligned along the same direction as the width of electric scooter 100.

For example, as shown in FIG. 3, with seat 126 in the unfolded configuration, first support member 500 and second support member 502 extend underneath second seat body portion 306 so as to provide support to seat 126. A substantially similar configuration of support members also extend underneath first seat body portion 304. In an example embodiment, the plurality of support members, including first support member 500 and second support member 502, may be struts that are filled with gas or liquid to provide dampening or shock absorption to seat 126. In other embodiments, the plurality of support members, including first support member 500 and second support member 502, may be cylinders or rods made of a rigid material to provide strength and support to seat 126, for example, to support the weight of a user of electric scooter 100 sitting on seat 126 when electric scooter 100 is in the riding configuration.

Figure 6:
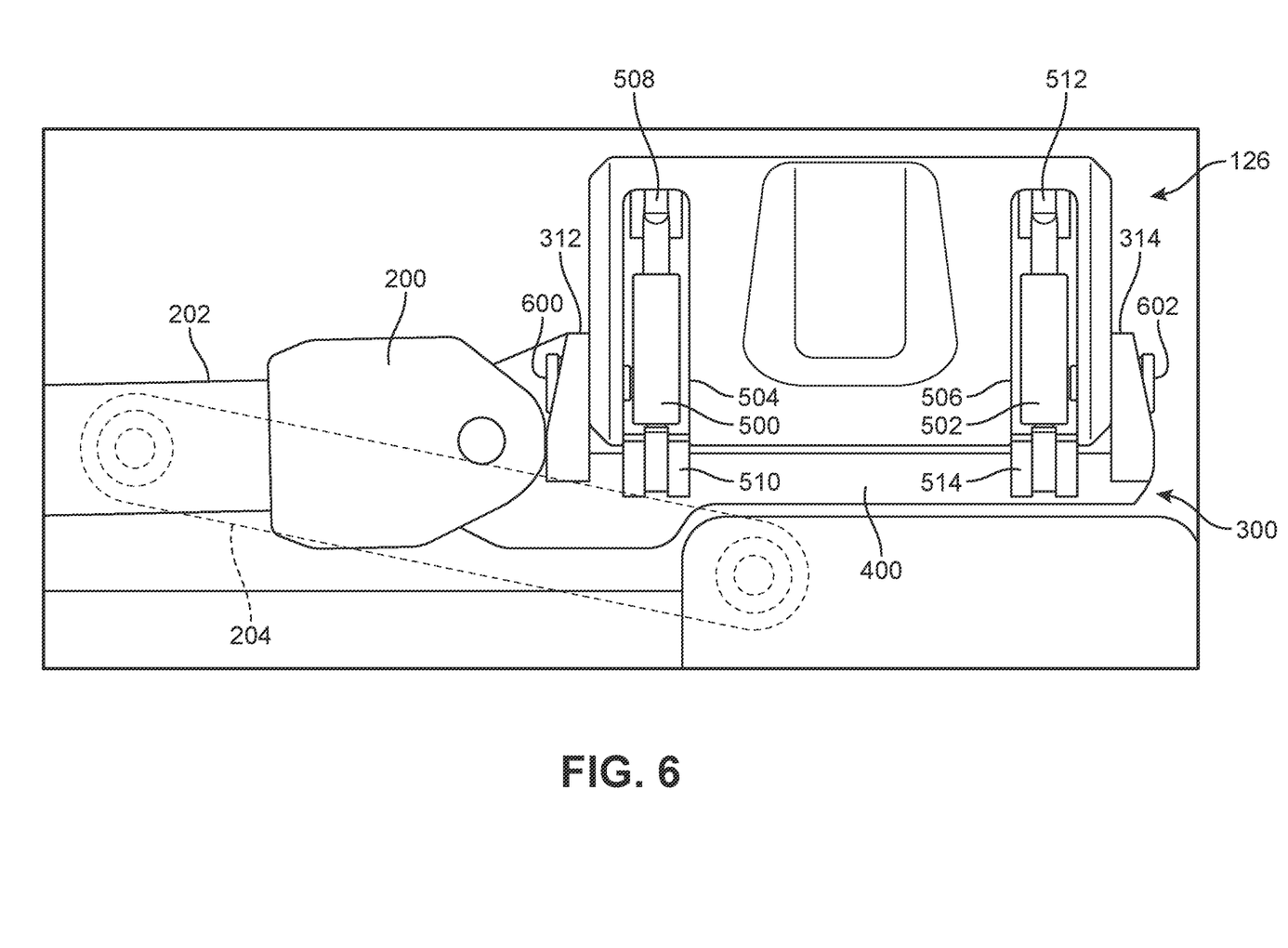
FIG. 6 is a side view of an example embodiment of a butterfly folding seat mechanism in accordance with aspects of the present disclosure.

FIG. 6 is a side view of an example embodiment of butterfly folding seat mechanism 300. In this embodiment, seat 126 is folded inside of outer casing 102 of electric scooter 100 in the stowed configuration. As shown in FIG. 6, when seat 126 is stowed inside outer casing 102, seat post 202 is approximately aligned with spine 400 of folding mechanism 300. In an example embodiment, the pair of plates 312, 314 of folding mechanism 300 may include one or more fasteners that connect to first seat body portion 304 and second seat body portion 306 at each end of folding mechanism 300. For example, as shown in FIG. 6, a first fastener 600 extends through front plate 312 and connects to second seat body portion 306 at one end and a second fastener 602 extends through rear plate 314 and connects to second seat body portion 306 at the opposite end. It should be understood that a substantially similar arrangement is provided for first seat body portion 304 with another pair of fasteners, one on each end of folding mechanism 300 at front plate 312 and rear plate 314.

In some embodiments, the seat body portions (e.g., first seat body portion 304 and second seat body portion 306) are configured to rotate or pivot around the fasteners (e.g., first fastener 600, second fastener 602, and the corresponding pair of fasteners associated with first seat body portion 304). That is, when seat 126 is folded along midline 302, as described above, first seat body portion 304 and second seat body portion 306 rotate approximately 90 degrees around the fasteners connected to front plate 312 and rear plate 314 at each end of folding mechanism 300. In an example embodiment, the fasteners may be pins having a smooth outer surface to allow first seat body portion 304 and second seat body portion 306 to freely rotate. In other embodiments, the fasteners may be other types of connecters, such as a screw, bolt, rod, or other mechanism.

Figure 7:
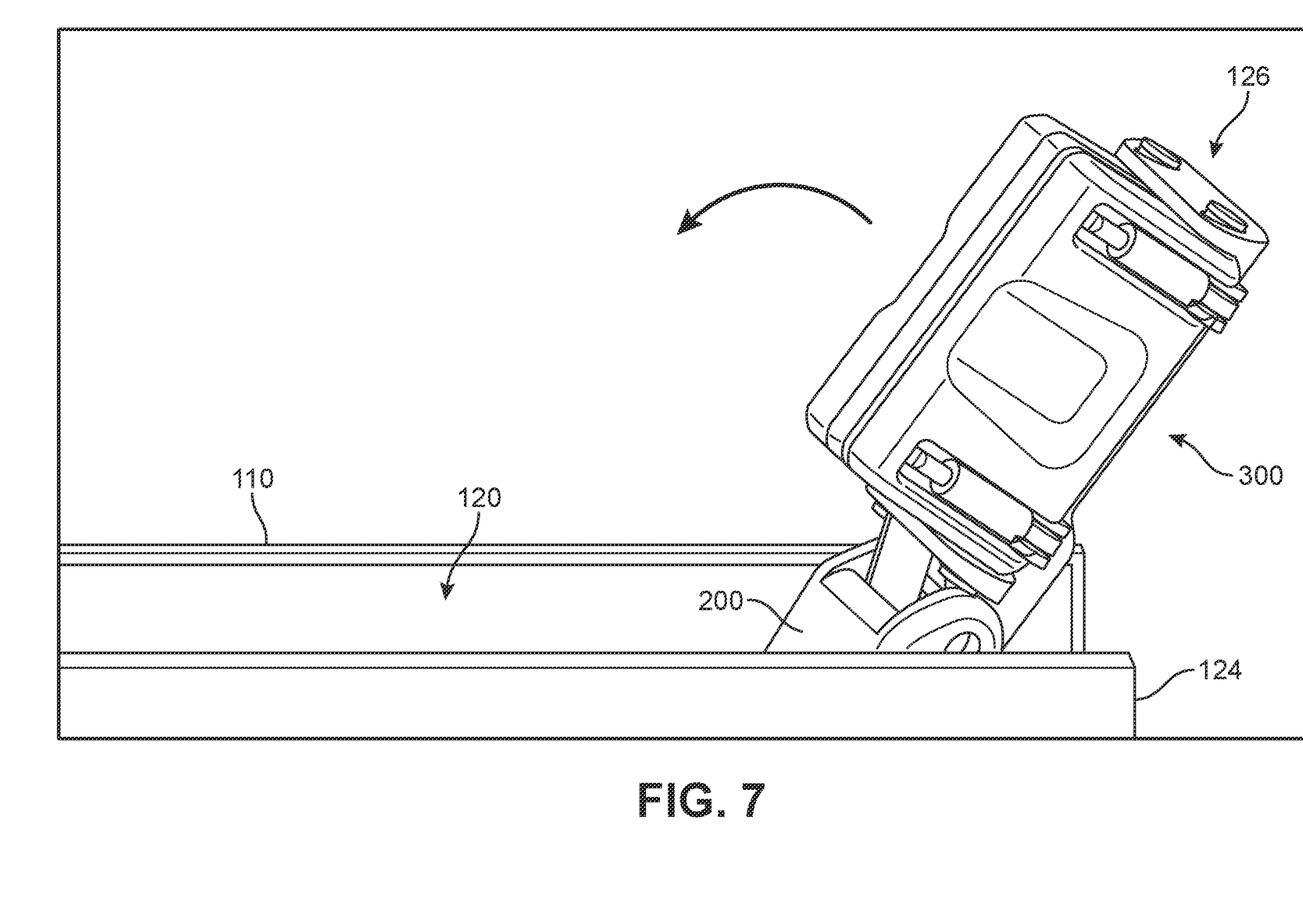
FIG. 7 is an enlarged view of the seat being transitioned to the stowed configuration by pivoting into the opening along the top of the compact personal transport device in accordance with aspects of the present disclosure.

FIG. 7 is an enlarged view of seat 126 being transitioned to the stowed configuration by pivoting into opening 120 along top edge 110 of electric scooter 100. In an example embodiment, after seat 126 is folded from the unfolded configuration to the folded configuration using folding mechanism 300 (as shown in FIGS. 3, 4, 5), seat 126 may then be stowed inside outer casing 102 of electric scooter 100. In this embodiment, seat 126 pivots or folds inwards at hinge mechanism 200 so that seat 126 may extend into opening 120 along top edge 110 of electric scooter 100. By using butterfly folding seat mechanism 300, seat 126 can fit within the space of opening 120 so that seat 126 may be stowed in the stowed configuration. Additionally, butterfly folding seat mechanism 300 allows seat to unfold and provide a seat surface that is wider than the width (W) of electric scooter 100 so that seat 126 provides a user with a stable support platform to sit on while riding electric scooter 100.

Figure 8:
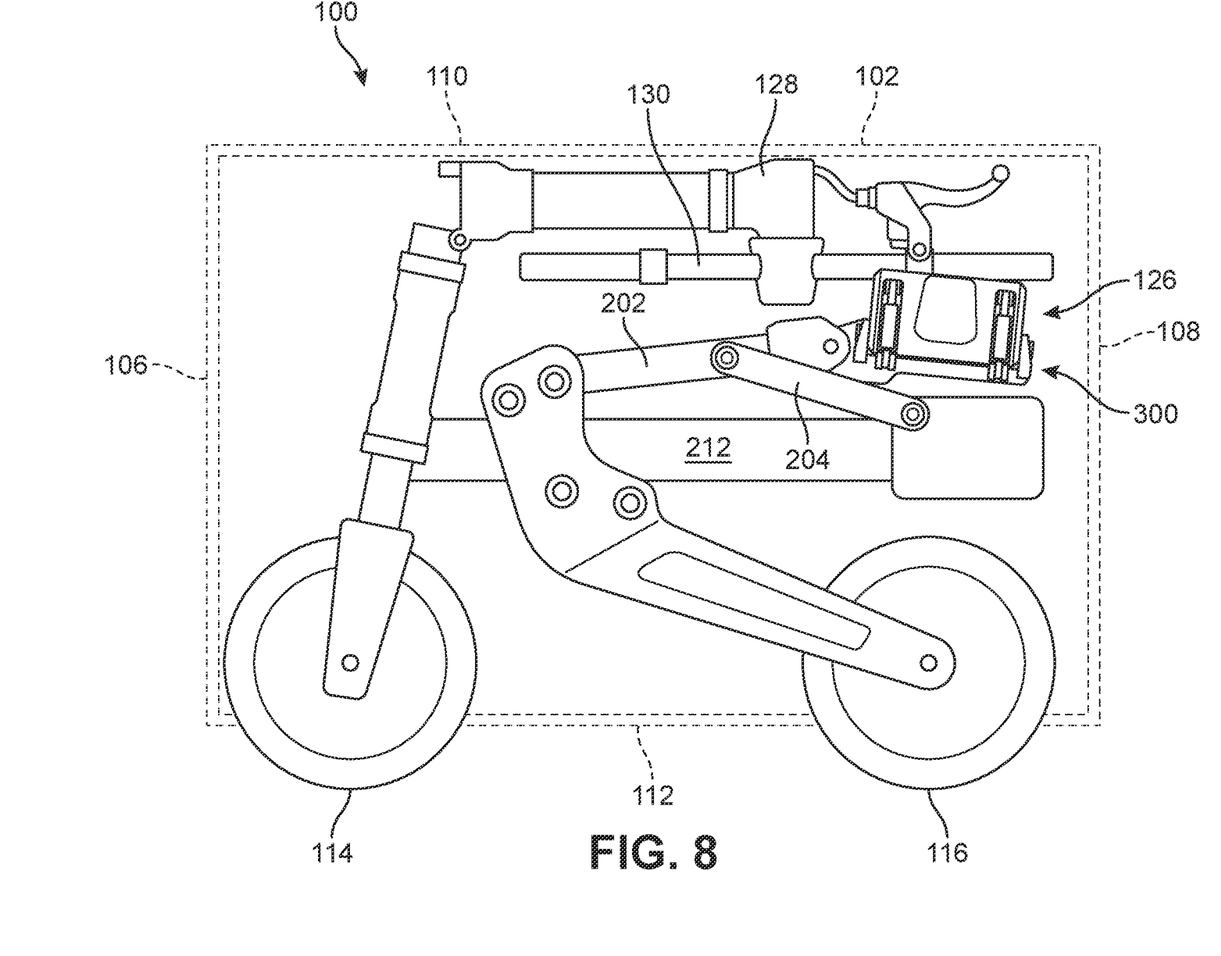
FIG. 8 is a side view of the compact personal transport device in the stowed configuration with the seat inside the outer casing in a stowed position in accordance with aspects of the present disclosure.

FIG. 8 is a side view of electric scooter 100 in the stowed configuration with seat 126 inside outer casing 102 in a stowed position. In this embodiment, the components of electric scooter 100, including, for example, steering assembly 128, handlebar 130, rear wheel 116, and seat 126 are all configured to fit inside of outer casing 102 when electric scooter 100 is in the stowed configuration. With this arrangement, electric scooter 100 may be conveniently transported in a compact form factor while in the stowed configuration and the components can be extended outside of outer casing 102 (e.g., as shown in FIG. 1) in the riding configuration when a user is ready to ride electric scooter 100.

By using folding mechanism 300 of the example embodiments, seat 126 of electric scooter 100 may provide a support surface for a user in the riding configuration and can fold in half to be stowed inside of outer casing 102 of electric scooter 100 in the stowed configuration. With this arrangement, electric scooter 100 may be a convenient personal transport device for a user to travel for "last-mile" or "first-mile" trips to a destination in the riding configuration and can be quickly converted to the stowed configuration to allow the user to carry or transport once they reach their destination.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A seat for a personal transport device comprising:
    a first seat body portion;
    a second seat body portion, the second seat body portion disposed on an opposite side of a midline from the first seat body portion, the midline being aligned along a longitudinal direction of the seat;
    a folding mechanism attached to the first seat body portion and the second seat body portion;
    wherein the folding mechanism comprises at least:
        a front plate disposed at one end of the seat and a rear plate disposed at an opposite end of the seat;
        a pair of fasteners connecting the first seat body portion to the front plate and the rear plate;

a pair of fasteners connecting the second seat body portion to the front plate and the rear plate;
a spine extending underneath the seat in the longitudinal direction; and
a plurality of support members, wherein each support member of the plurality of support members is attached at one end to the spine and at an opposite end to at least one of the first seat body portion or the second seat body portion;
wherein the folding mechanism is configured to fold the seat along the midline to transition the seat between an unfolded configuration and a folded configuration by rotating the first seat body portion and the second seat body portion around each respective pair of fasteners; and
wherein the plurality of support members have a vertical orientation when the seat is in the folded configuration and a horizontal orientation when the seat is in the unfolded configuration.

2. The seat according to claim 1, wherein the first seat body portion and the second seat body portion are substantially flat in the unfolded configuration to provide a seat surface.

3. The seat according to claim 2, wherein the seat surface comprises a first seat surface on a top portion of the first seat body portion and a second seat surface on a top portion of the second seat body portion.

4. The seat according to claim 3, wherein the first seat surface and the second seat surface are facing towards each other in the folded configuration.

5. The seat according to claim 1,
wherein the plurality of support members includes two support members attached between the spine and the first seat body portion and two support members attached between the spine and the second seat body portion.

6. The seat according to claim 1, wherein the plurality of support members are orthogonal to the spine.

7. The seat according to claim 1, further comprising recesses on an underside of the at least one of the first seat body portion or the second seat body portion;
wherein the recesses are configured to receive the plurality of support members.

8. A butterfly folding seat mechanism for a personal transport device comprising:
a spine extending underneath a seat of the personal transport device, the spine aligned along a longitudinal direction;
a pair of plates disposed at opposite ends of the spine, the pair of plates including a front plate and a rear plate;
a pair of fasteners connecting a first seat body portion to the front plate at one end and the rear plate at an opposite end;
a pair of fasteners connecting a second seat body portion to the front plate at one end and the rear plate at the opposite end; and
a plurality of support members, wherein each support member of the plurality of support members is attached at one end to the spine and at an opposite end to at least one of the first seat body portion or the second seat body portion; and
wherein the plurality of support members have a vertical orientation when the seat is in a folded configuration and a horizontal orientation when the seat is in an unfolded configuration.

9. The butterfly folding seat mechanism according to claim 8, wherein the plurality of support members are orthogonal to the spine.

10. The butterfly folding seat mechanism according to claim 9, further comprising recesses on an underside of the at least one of the first seat body portion or the second-seat body portion; and
wherein the recesses are configured to receive the plurality of support members.

11. The butterfly folding seat mechanism according to claim 8, wherein the plurality of support members comprise:
two support members attached to the spine and the first seat body portion; and
two support members attached to the spine and the second body portion.

12. The butterfly folding seat mechanism according to claim 8, wherein the plurality of support members comprise gas or liquid filled struts that provide dampening or shock absorption to the seat of the personal transport device.

13. The butterfly folding seat mechanism according to claim 8, wherein the butterfly folding seat mechanism is configured to fold the seat at a midline aligned along the longitudinal direction to transition the seat between the unfolded configuration and the folded configuration by rotating the first seat body portion and the second body portion around each respective pair of fasteners.

14. The butterfly folding seat mechanism according to claim 13,
wherein the first seat body portion and the second seat body portion are substantially flat in the unfolded configuration to provide a seat surface.

15. The butterfly folding seat mechanism according to claim 14, wherein the seat surface comprises a first seat surface on a top portion of the first seat body portion and a second seat surface on a top portion of the second seat body portion.

16. The butterfly folding seat mechanism according to claim 15, wherein the first seat surface and the second seat surface are facing towards each other in the folded configuration.

17. A personal transport device comprising:
an outer casing;
a front wheel;
a rear wheel; and
a seat, the seat comprising:
a first seat body portion;
a second seat body portion, the second seat body portion disposed on an opposite side of a midline from the first seat body portion, the midline being aligned along a longitudinal direction of the seat;
a folding mechanism attached to the first seat body portion and the second seat body portion;
wherein the folding mechanism comprises at least:
a front plate disposed at one end of the seat and a rear plate disposed at an opposite end of the seat;
a pair of fasteners connecting the first seat body portion to the front plate and the rear plate;
a pair of fasteners connecting the second seat body portion to the front plate and the rear plate;
a spine extending underneath the seat in the longitudinal direction; and
a plurality of support members, wherein each support member of the plurality of support members is attached at one end to the spine and at an opposite end to at least one of the first seat body portion or the second seat body portion;

wherein the folding mechanism is configured to fold the seat along the midline to transition the seat between an unfolded configuration and a folded configuration by rotating the first seat body portion and the second seat body portion around each respective pair of fasteners; and wherein the plurality of support members have a vertical orientation when the seat is in the folded configuration and a horizontal orientation when the seat is in the unfolded configuration.

18. The personal transport device according to claim 17, wherein the plurality of support members includes two support members attached between the spine and the first seat body portion and two support members attached between the spine and the second seat body portion.

19. The personal transport device according to claim 17, wherein the outer casing includes an opening disposed along a top surface of the personal transport device; and wherein the seat in the folded configuration is configured to pivot into the opening to be stowed inside of the outer casing.

20. The personal transport device according to claim 19, further comprising:

a hinge mechanism connected to the seat at one end and attached internally inside the outer casing at an opposite end; and wherein the hinge mechanism is configured to pivot the seat into the opening along the top surface of the personal transport device.

* * * * *